(12) United States Patent
Mahani (10) Patent No.: US 11,350,003 B1
(45) Date of Patent: May 31, 2022

(54) DYNAMIC PRINT ENGINE PRESENTATION VIA A GUI

(71) Applicant: Maryamossadat Nematollahi Mahani, Boulder, CO (US)

(72) Inventor: Maryamossadat Nematollahi Mahani, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/178,656

(22) Filed: Feb. 18, 2021

(51) Int. Cl.
*H04N 1/00* (2006.01)
*G06F 3/12* (2006.01)

(52) U.S. Cl.
CPC ....... *H04N 1/00477* (2013.01); *G06F 3/1204* (2013.01); *G06F 3/1259* (2013.01); *G06F 3/1267* (2013.01); *G06F 3/1282* (2013.01); *H04N 1/00424* (2013.01)

(58) Field of Classification Search
None
See application file for complete search history.

(56) References Cited

U.S. PATENT DOCUMENTS

| | | | |
|---|---|---|---|
| 6,520,616 B1* | 2/2003 | Parks | B41J 29/393 347/19 |
| 6,707,563 B1* | 3/2004 | Barry | G06F 3/121 358/1.14 |
| 7,450,256 B2 | 11/2008 | Simpson et al. | |
| 8,228,514 B2 | 7/2012 | Yokoyama | |
| 8,390,833 B2 | 3/2013 | Takahashi | |
| 8,587,804 B2 | 11/2013 | Inada et al. | |
| 2007/0253020 A1 | 11/2007 | Hull et al. | |
| 2021/0203797 A1* | 7/2021 | Kawano | H04N 1/00408 |

OTHER PUBLICATIONS

In-Log; Auto-Count; Shop floor production Intelligence; 2016 Merten maschinenbau und Vertriebs GmbH.
SpencerMetrics; Connect Automatic Production Analytics for productivity & cost reduction; 2019.

* cited by examiner

*Primary Examiner* — Frantz Bataille
(74) *Attorney, Agent, or Firm* — Duft & Bornsen, PC (57) ABSTRACT

Systems and methods are provided for status reporting for a printer. In one embodiment, the status reporting device includes a display, and a controller that receives progress information describing print engines of a printer at a print shop, generates a Graphical User Interface (GUI) for presentation via the display, determines an arrangement of the print engines at the print shop, presents the GUI via the display with a single status object for the printer when the print engines are in a first arrangement at the print shop, and presents the GUI via the display with multiple status objects for the printer when the print engines are in a second arrangement at the print shop. Each of the multiple status objects corresponds with one of the print engines.

20 Claims, 7 Drawing Sheets

DYNAMIC PRINT ENGINE PRESENTATION VIA A GUI

TECHNICAL FIELD

The following disclosure relates to the field of printing, and in particular, to management of printers in a print shop.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads. Some printers comprise two or more marking engines that are designed for collaborative printing, in which instance the marking engines may be separated into physically distinct components for placement at different locations on a print line of a print shop.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Viewing the status of a print line remains a priority activity for many print shop operators. However, the ability of Graphical User Interfaces (GUIs) to present this information in an intuitive manner remains limited. Thus, those of ordinary skill in the art continue to seek out new techniques and systems for addressing the issues discussed above.

SUMMARY

Embodiments described herein provide for enhanced GUIs that dynamically and automatically determine whether to present a single printer using two GUI elements or one, based on the configuration/arrangement of marking engines of the printer within a print line. This provides a benefit by providing relevant contextual information to a print shop operator in an intuitive manner, without unnecessarily increasing visual clutter.

One embodiment is a system that includes a status reporting device. The status reporting device includes a display, and a controller that receives progress information describing print engines of a printer at a print shop, generates a Graphical User Interface (GUI) for presentation via the display, determines an arrangement of the print engines at the print shop, presents the GUI via the display with a single status object for the printer when the print engines are in a first arrangement at the print shop, and presents the GUI via the display with multiple status objects for the printer when the print engines are in a second arrangement at the print shop. Each of the multiple status objects corresponds with one of the print engines.

A further embodiment is a method that includes receiving progress information describing print engines of a printer at a print shop, generating a Graphical User Interface (GUI) for presentation via a display, determining an arrangement of the print engines at the print shop, presenting the GUI with a single status object for the printer via the display, when the print engines are in a first arrangement at the print shop, and presenting the GUI with multiple status objects for the printer via the display when the print engines are in a second arrangement at the print shop. Each of the multiple status objects corresponds with one of the print engines.

A further embodiment is a non-transitory computer readable medium embodying programmed instructions which, when executed by a processor, are operable for performing a method. The method includes receiving progress information describing print engines of a printer at a print shop, generating a Graphical User Interface (GUI) for presentation via a display, determining an arrangement of the print engines at the print shop, presenting the GUI with a single status object for the printer via the display, when the print engines are in a first arrangement at the print shop, and presenting the GUI with multiple status objects for the printer via the display when the print engines are in a second arrangement at the print shop. Each of the multiple status objects corresponds with one of the print engines.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
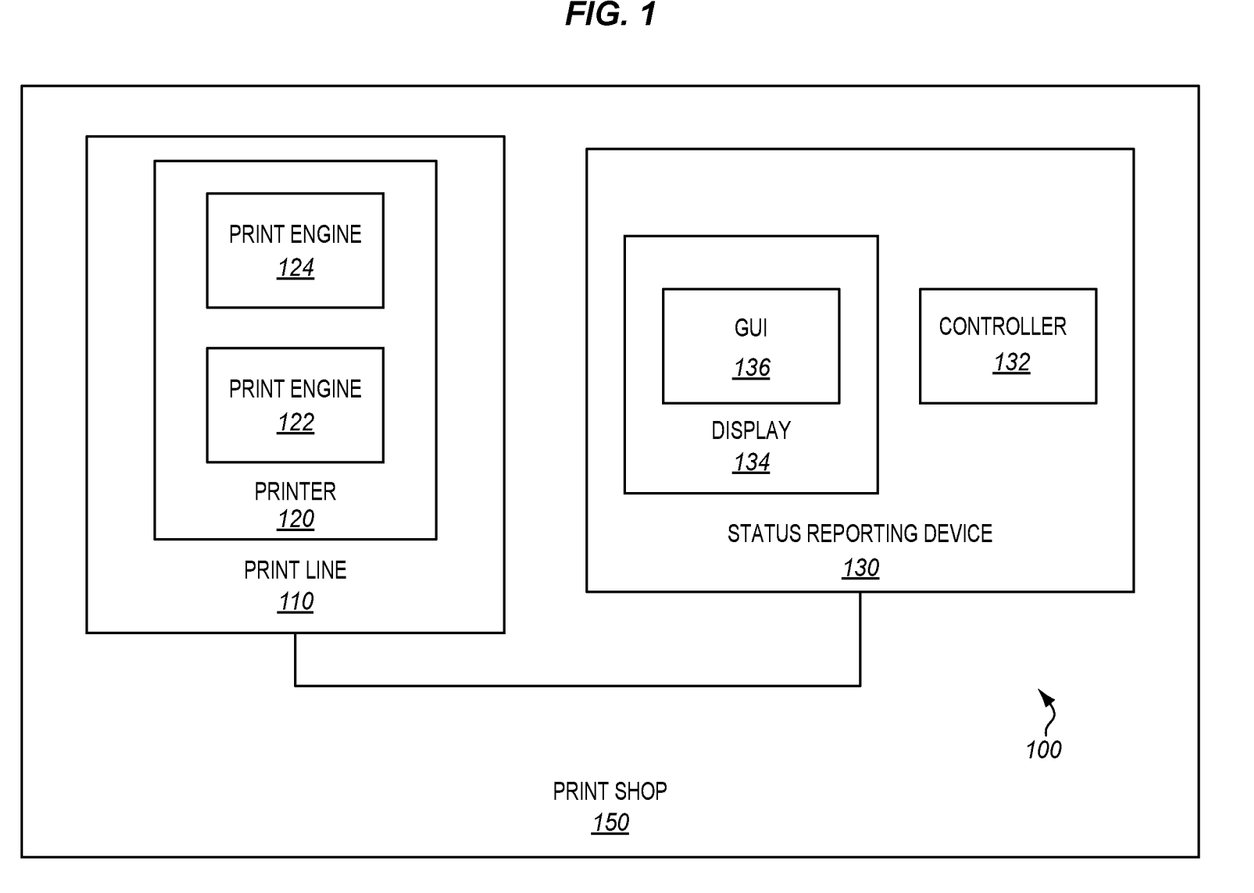
FIG. 1 is a block diagram of a printing system in an illustrative embodiment.

FIG. 1 is a block diagram of a printing system 100 within a print shop 150 (e.g., a physical location in which printers are arranged) in an illustrative embodiment. Printing system 100 comprises any system, device, or component operable to mark print media in accordance with print data for a print job. In this embodiment, printing system 100 comprises a status reporting device 130, which receives input describing the progress of a printer 120 at a print line 110 as print engines 122 and 124 mark print media in accordance with print data for print jobs. Status reporting device 130 receives and processes this progress data to dynamically update a display 134 to present GUI 136 in order to inform the decision-making process of a print shop operator.

Print line 110 comprises any system, device, or component operable to control the movement of a web of print media, drive the web of print media to a printer 120 that marks the print media in accordance with received instructions in print data for a print job, and to perform any additional processing on the web of print media (e.g., drying, cutting, trimming, stacking, etc.) after printing has been completed. In this embodiment, print line 110 includes one or more printers 120 designed for operating on continuous-forms print media. The printer 120 marks a web of print media which travels through the printer in a web direction (also referred to as a "process direction"). For example, printer 120 may include a print controller that directs the operations of an array of printheads at a print engine of the printer 120. The printheads then operate nozzles to eject a marking fluid (e.g., ink) onto the print media in accordance with instructions from the print controller as the print media advances. Each print engine 122 and/or 124 may be implemented as a physically distinct component of the printer. Thus, a single print controller at the printer 120 may direct the operations of multiple print engines 122 and 124, even if the print engines are physically separated from each other along the print line 110.

Status reporting device 130 comprises any device capable reviewing and reporting the progress of one or more printers 120 at one or more print lines 110. Status reporting device 130 has been beneficially enhanced to alter the number of status objects used to represent a printer 120 in a GUI 136, based on the arrangement of print engines for the printer 120 at a print line 110. In this embodiment, status reporting device 130 is implemented as an independent, network-connected server which is capable of determining printer status based on communications with a print controller of the printer 120.

Specifically, in this embodiment, controller 132 is capable of receiving information such as the status of a print job, number of linear feet printed, whether a printer is active or idle, etc., based on communications with the print controller of the printer 120 and/or on communications with a print server managing the printer 120. In this embodiment, controller 132 also receives information from the print controller that indicates an arrangement of the print engines, such as whether the print engines 122 and 124 are arranged in serial or in parallel at the print line 110, to facilitate duplex or simplex printing, respectively. The print controller may determine the arrangement of the print engines 122 and 124 based on information received from a print server, or may determine the arrangement by querying the print engines 122 and 124.

Based on received status information, controller 132 generates a GUI 136 and directs display 134 to present the GUI 136 to a user. Display 134 comprises any suitable device for visually displaying digital information, and may comprise a monitor, projector, touchscreen, etc. The GUI 136 presents information pertaining to printer status, which facilitates the decision-making of a print shop operator. Controller 132 may be implemented as custom circuitry, as a hardware processor executing programmed instructions, etc.

The particular arrangement, number, and configuration of components described herein is illustrative and non-limiting. Illustrative details of the operation of status reporting device 130 will be discussed with regard to FIG. 2. Assume, for this embodiment, that a printer 110 has received print data for one or more print jobs (e.g., Portable Document Format (PDF) data accompanied by a Job Definition Format (JDF) job ticket), and has initiated printing of the print job onto a web of print media. A print controller at the printer handles (e.g., rasterizes) print data and provides the data to the print engines. In one embodiment, this process continues even if the print engines are printing different jobs at the same time.

Figure 2:
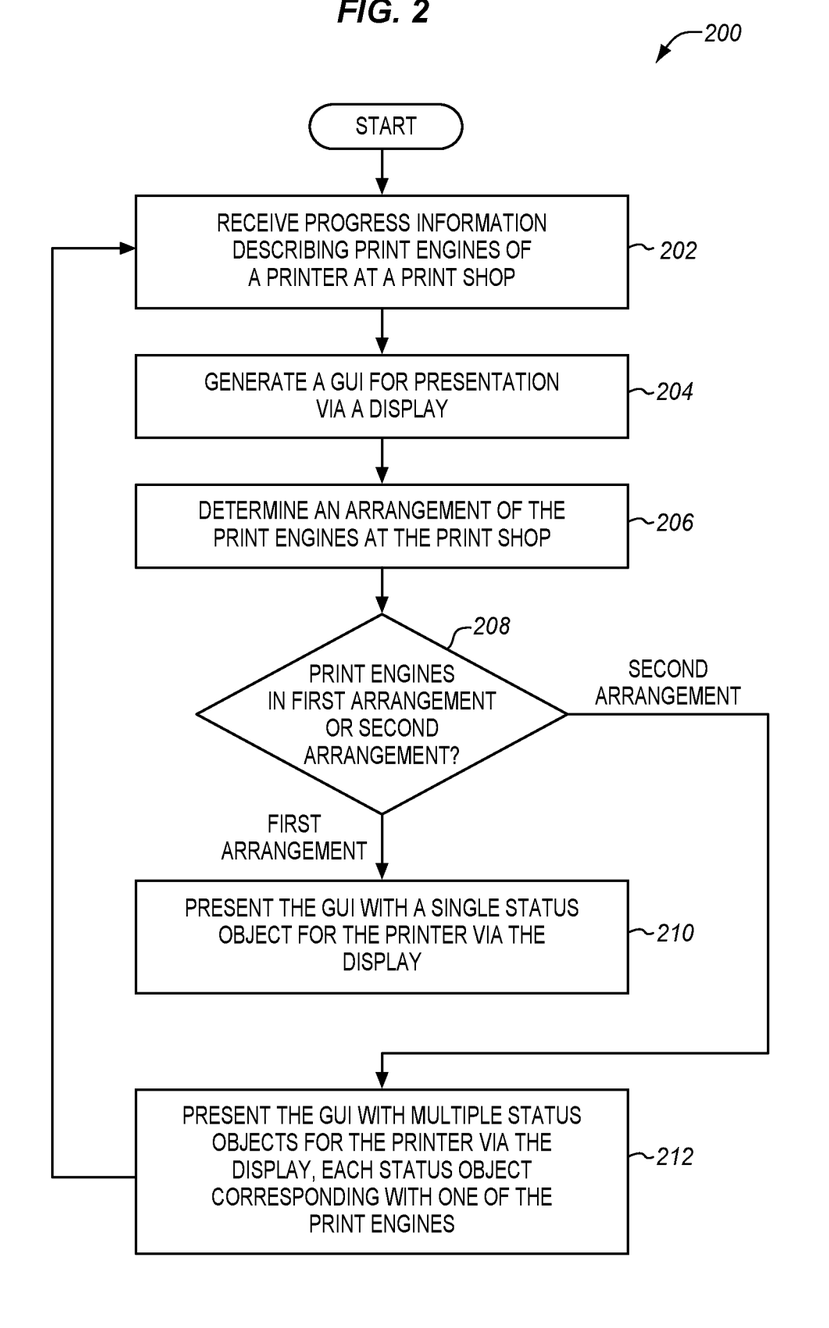
FIG. 2 is a flowchart illustrating a method for operating a printing system in an illustrative embodiment.

FIG. 2 is a flowchart illustrating a method 200 for operating a printing system in an illustrative embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 132 receives progress information describing print engines 122 and 124 of a printer 120 at a print line 110 of the print shop 150. In one embodiment, controller 132 receives the progress information via communication with a print server that transmits print jobs to the printer. In a further embodiment, controller 132 receives the progress information from a print controller of the printer. As used herein, progress information refers to the progress of a printer and/or print engine in processing (e.g., rasterizing) or printing one or more print jobs. This information may include an amount of linear feet printed by the printer, a percentage of print data that has been rasterized, whether a printer or print engine is active or idle, the name of a print job currently being processed or printed, the number of print jobs in a queue for a printer or print engine, or other information. In one embodiment, the progress information is received as Simple Network Management Protocol (SNMP) data, while in further embodiments the progress information is received as Job Management Format (JMF) data.

In step 204, controller 132 generates a GUI 136 for presentation via the display 134. In one embodiment, this comprises generating Hypertext Markup Language (HTML) in combination with Cascading Style Sheet (CSS) data in order to characterize the status of the printer 120 and/or printing engines 122 and 124, based on the progress information. For example, generating the GUI 136 may comprise generating and dynamically updating a web page to include metrics describing the progress information received in step 202.

In step 206, controller 132, determines an arrangement of the print engines 122 and 124 at the print line 110 of the print shop 150. The arrangement of the print engines 122 and 124 may be determined based on communications with a print controller at the printer 120, and/or communications with a print server. For example, a print controller or print server may dynamically determine whether print engines are arranged in a serial or parallel manner based on information provided by a print shop operator, based on communications between the print engines 122 and 124, whether a print server has requested operations of the print engines 122 in a dual-simplex or duplex mode, and/or other information. The information from a print server or print controller may be conveyed to controller 132 via any suitable means of communication, such as via SNMP or JMF data. In one embodiment, analysis of a job queue may indicate the existence of only duplex jobs for the printer (indicating a serial arrangement of print engines), or the existence of only simplex jobs for the printer (indicating a parallel arrangement of print engines).

In step 208, controller 132 determines whether the print engines 122 and 124 are in a first arrangement or a second arrangement. As used herein, an "arrangement" refers to a unique physical placement of the print engines 122 and 124 relative to each other and to other devices within a print line. In one embodiment, an arrangement is any difference in ordering of the print engines 122 and 124 upstream or downstream relative to each other for a web of print media, and/or placement of the print engines 122 and 124 at different webs of print media. Thus, a configuration where print engines 122 and 124 each print onto a different web of print media is a different arrangement than a configuration where print engines 122 and 124 both print onto the same web of print media. In one embodiment, the first arrangement is associated with duplex printing (wherein each print engine marks a different side of a web of print media), while the second arrangement is associated with dual simplex printing (wherein each print engine marks a different web of print media).

When the print engines 122 and 124 are in the first arrangement, in step 210 the controller 132 presents the GUI 136 with a single status object for the printer 120 via the display 134. As used herein, a "status object" comprises a dynamically updated icon, text, graphic, and/or combination thereof that describes activities being currently performed by a printer or print engine. Examples of status objects include GUI elements that indicate a job currently being handled by a printer, an amount of progress on a print job by the printer, a number of linear feet or pages printed by a printer, a number of jobs printed by the printer, any suitable combination of such GUI elements, etc. Furthermore, as used herein, a status object refers to an element that provides the same type(s) of information, displayed in the same arrangement. That is, each status object within a GUI presents the same type of information, and in the same manner, as other status objects in the GUI. Thus, in embodiments where a status object is a progress bar for job progress, other status objects in that embodiment are also progress bars for job progress.

When multiple print engines are represented with a single status object, the status object represents overall printing progress for the printer as a whole (e.g., the progress of multiple print engines in printing a print job onto a single web). In one embodiment, the progress information shown by the status object consists of progress information pertaining to the most "downstream" of the print engines 122 and 124. In further embodiments, controller 132 selectively chooses the print engine to report progress for, or combines (e.g., averages) progress information across the print engines of the printer for display in the status object.

Alternatively, when the print engines 122 and 124 are in a second arrangement, in step 210 the controller 132 presents the GUI 136 with multiple status objects for the printer 120 via the display 134. In this circumstance, each status object represents the status of a separate print engine at the printer 120. Thus, if each print engine is printing a different print job at a different web, the status of each print job may be beneficially monitored via the status object for the corresponding print engine.

In further embodiments, status reporting device 130 stores a profile for different arrangements of the print engines, wherein the first profile provides a single status object for the printer, while the second profile provides a status object for each print engine. Then, based on the determined arrangement (e.g., as indicated by the print controller of the printer), the corresponding profile is loaded for the GUI 136.

Figure 3:
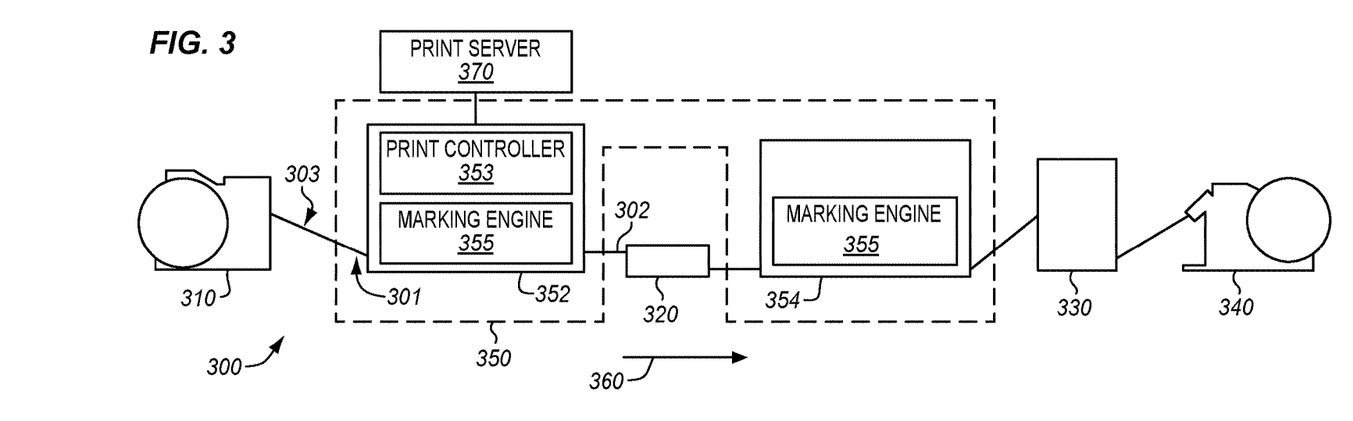
FIGS. 3-4 depict variations of print lines in illustrative embodiments.
Figure 4:
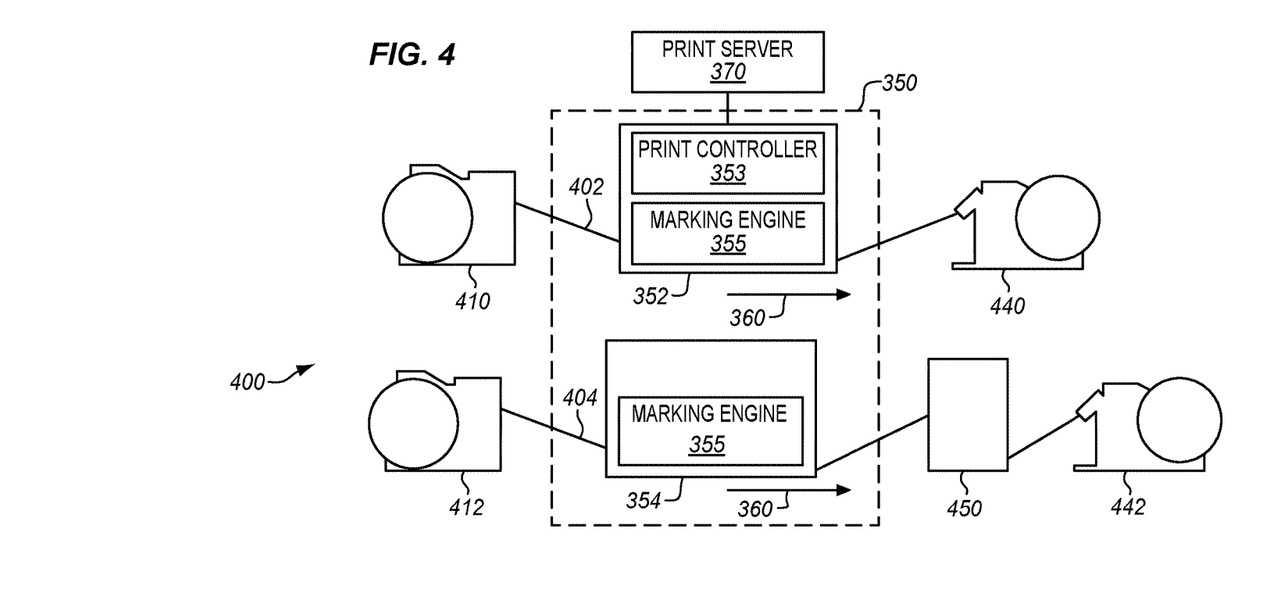

FIGS. 3-4 depict variations of print lines in illustrative embodiments. Specifically, FIG. 3 depicts a print line 300 wherein print engines 352 and 354 of a printer 350 are disposed in a serial arrangement in an illustrative embodiment, while FIG. 4 depicts a print line 400 wherein print engines 352 and 354 of the printer 350 are disposed in a parallel arrangement in an illustrative embodiment.

The print line 300 of FIG. 3 corresponds with print engines 352 and 354 operating in a duplex printing mode. That is, print engine 352 may print onto a first side 303 of a web 302 of print media, while print engine 354 may print onto a second side 301 of the web 302. Print engine 354 is "downstream" of print engine 352 with respect to a process direction 360 of the web 302. In this embodiment, a print server 370 coordinates the assignment and distribution of print jobs across printers. The print server 370 therefore sends print data for a print job to the print controller 353 of a printer 350. The printer 350 also receives the web 302 from a spool 310 of print media. The web 302 continues in the process direction 360 to print engine 352. Print engine 352 utilizes a marking engine 355 (e.g., an array of printheads) to mark a first side of the web 302 based on print data processed by a print controller 353 housed at the print engine 352. The web 302 proceeds to a guide 320 which flips the web, and enters print engine 354. At print engine 354, marking engine 355 marks the second side of the web based on instructions received from the print controller 353 (e.g., via a wired or wireless connection). The web 302 proceeds to a post-print device 330 (e.g., a scanner, or other tool), and is then received at an uptake spool 340. Thus, in the collaborative arrangement shown in FIG. 3, both print engines 352 and 354 are disposed in a serial configuration, wherein the print engines 352 and 354 operate collaboratively under the direction of a print controller 353 to produce a print job at a single web 302. During the printing process, print controller 353 may report progress information to print server 370, a status reporting device 130, or other components.

The print line 400 of FIG. 4 corresponds with print engines 352 and 354 operating in a dual simplex printing mode. That is, print engine 352 may print onto a first web 402 of print media, while print engine 354 may print onto a second web 404 of print media. In this embodiment, the printer 350 receives the first web 402 from a spool 410 of print media at print engine 352, and receives the second web 404 from a spool 412 of print media at print engine 354. Print engine 352 utilizes a marking engine 355 to mark a single side of the first web 402 based on print data processed by a print controller 353 housed at the print engine 352. The first web 402 then proceeds to an uptake spool 440. As a parallel process, at print engine 354, marking engine 355 marks a single side of the second web 404 based on instructions received from the print controller 353 (e.g., via a wired or wireless connection). The web 404 proceeds to a post-print device 450 (e.g., a scanner, or other tool), and is then received at an uptake spool 442. Thus, in the arrangement shown in FIG. 4, both print engines 352 and 354 are disposed in a parallel configuration, wherein the print engines 352 and 354 operate under the direction of a single print controller 353 to print onto different webs of print media (e.g., in order to print different print jobs).

Figure 5:
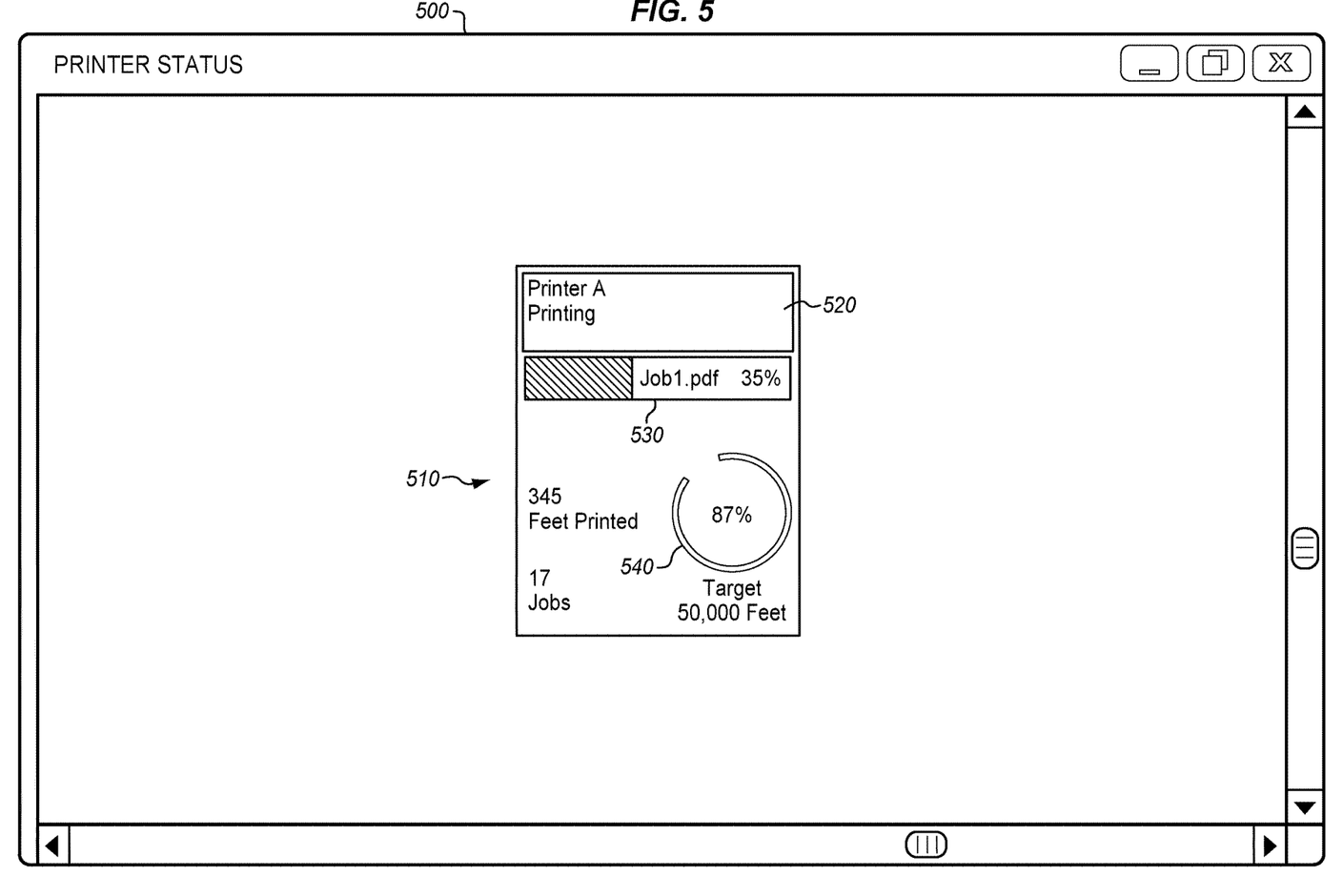
FIGS. 5-7 depict GUIs that automatically control a number of status objects used to represent a printer in illustrative embodiments.
Figure 6:
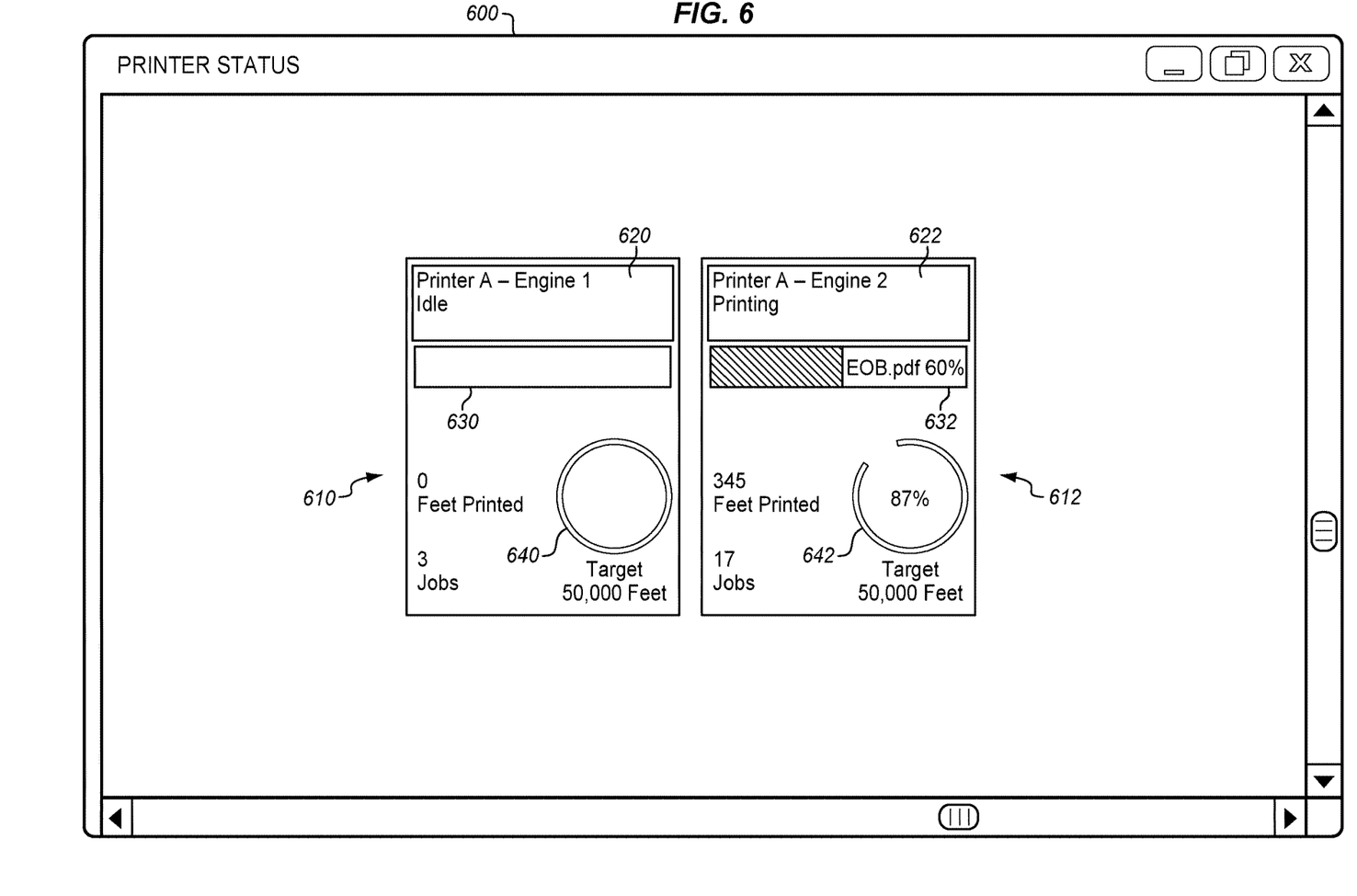
Figure 7:
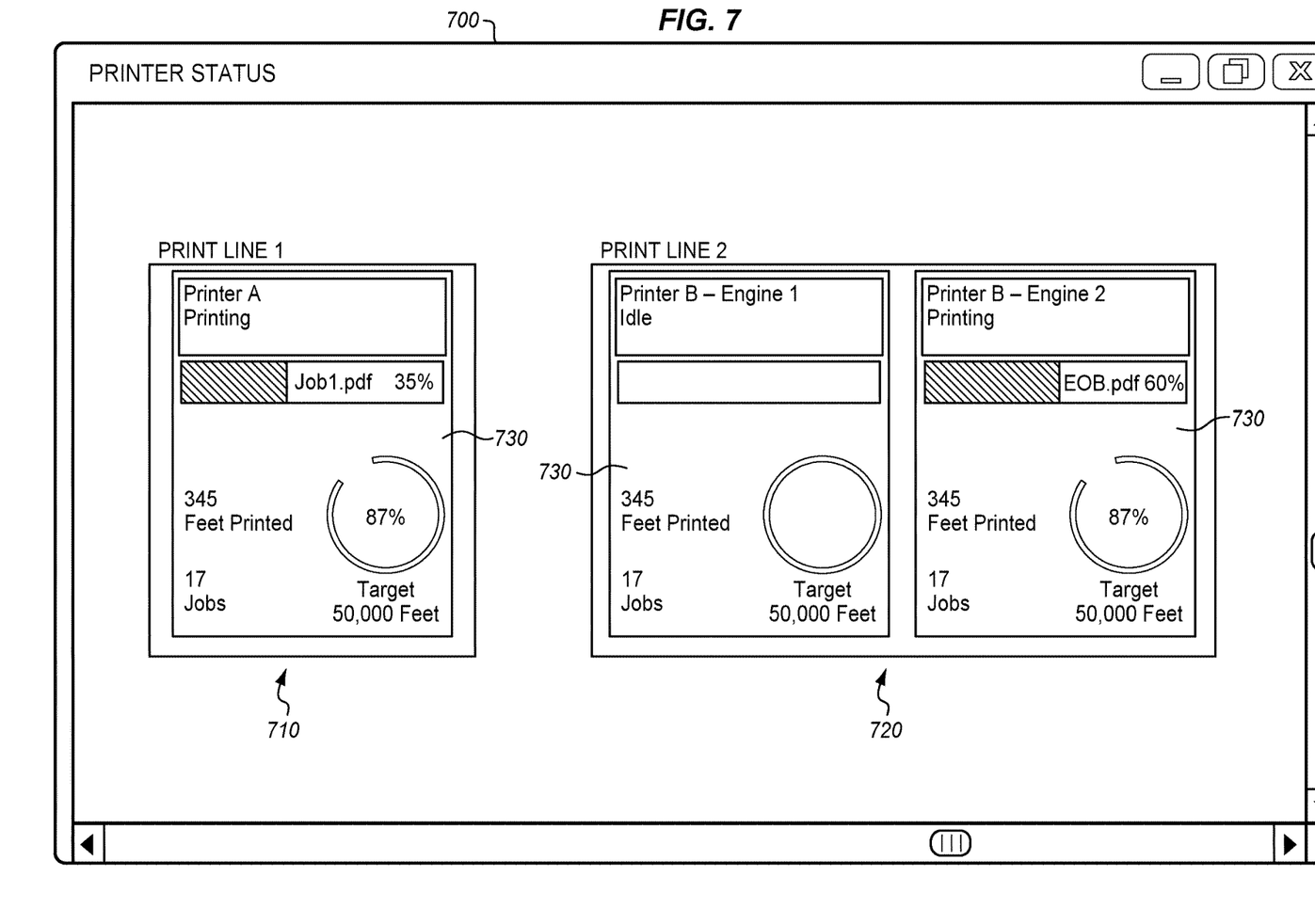

FIGS. 5-7 depict GUIs that automatically control a number of status objects used to represent a printer in illustrative embodiments. FIG. 5 depicts a GUI 500 that utilizes a single status object 510 to represent a both print engines of a printer in an illustrative embodiment. For example, GUI 500 may be utilized when the print engines are in a duplex arrangement. In this embodiment, the status object 510 comprises a header 520 that identifies a name of the printer, as well as a textual description stating whether the printer is printing, idle, or has encountered an error. Below the header, a progress bar 530 is presented. The progress bar 530 visually indicates progress in printing a single print job, and names the source file from which print data for the print job has been acquired. A meter 540 is also provided. Meter 540 indicates, as a percentage, the number of linear feet printed by the printer over a period of time, as compared to a target amount. Further information, such as number of linear feet printed for a specific job, number of jobs printed, number of jobs in queue, and other information may also be presented at the status object 510. By dynamically representing multiple print engines of a printer via a single status object, GUI 500 reduces visual clutter that would be largely duplicative and distracting for duplex jobs. In a print shop that includes many print lines (e.g., ten or more), this provides a notable benefit in conserving the attentional resources of print shop operators.

FIG. 6 depicts a GUI 600 that utilizes multiple status objects 610 and 612 to represent the print engines of a printer in an illustrative embodiment. For example, GUI 600 may be utilized when the print engines are in a dual simplex arrangement. In this embodiment, each status object represents a different print engine of the printer. Furthermore, the status objects each represent the same type of information, in the same arrangement, as the single status object of the GUI 500 of FIG. 5. Thus, the status objects 610 and 612, like the status object 510, each respectively include a header 620 and 622, a progress bar 630 and 632, a meter 640 and 642, and/or other information. By dynamically representing multiple print engines of a printer via separate status objects, GUI 600 ensures that each simplex job (which may vary between the print engines) is tracked and reported for review by a print shop operator. In further embodiments, a controller 132 of a status reporting device 130 is capable of dynamically processing information from print controllers of printers to determine the current arrangement of print engines. In response to detecting a change in the arrangement (e.g., from serial to parallel), the controller 132 updates the GUI 136 to either merge or split status objects in order to represent the current configuration of the printer. In such embodiments, production numbers from the print engines may be re-allocated to account for the change in configuration. For example, if the print engines change arrangement to a serial configuration, production numbers may be aggregated and depicted for a first print engine, while a second print engine is set to a production amount of zero for all categories (effectively combining the two print engines into one at the GUI).

In FIG. 7, GUI 700 includes multiple sections 710 and 720 to represent separate print lines at a print shop. Each section is populated with information received from one or more print controllers at the corresponding print line. In this embodiment, the same model of multi-print engine printer is used at each print line, but the print engines are arranged in different configurations. Thus, printer A, which includes print engines in a serial arrangement, is represented using a single status object 730. Meanwhile, printer B, which includes print engines in a parallel arrangement, is represented using multiple status objects 730.

Examples

In the following examples, additional processes, systems, and methods are described in the context of a printing system that dynamically presents a GUI.

Figure 8:
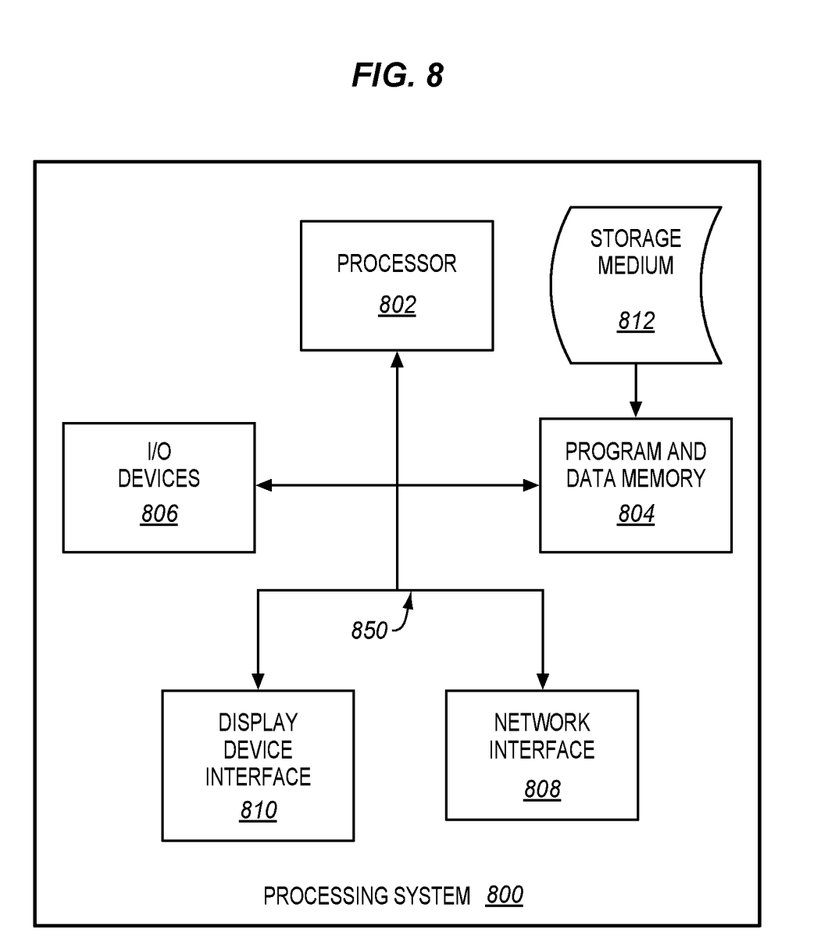
FIG. 8 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of printing system 100 to perform the various operations disclosed herein. FIG. 8 illustrates a processing system 800 operable to execute a computer readable medium embodying programmed instructions to perform desired functions in an illustrative embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 may be integrated with the system to interface to one or more display devices, such as printing systems and screens for presentation of data generated by processor 802.

Although specific embodiments were described herein, the scope of the invention is not limited to those specific embodiments. The scope of the invention is defined by the following claims and any equivalents thereof.

What is claimed is:

1. A system comprising:
   a status reporting device, comprising:
      a display; and
      a controller configured to receive progress information describing print engines of a printer at a print shop, to generate a Graphical User Interface (GUI) for presentation via the display, to determine an arrangement of the print engines at the print shop, wherein the arrangement comprises a physical placement of the print engines relative to each other within a print line, to present the GUI via the display with a single status object for the printer when the print engines are in a first arrangement at the print shop, and to present the GUI via the display with multiple status objects for the printer when the print engines are in a second arrangement at the print shop, wherein each of the multiple status objects corresponds with one of the print engines.

2. The system of claim 1 wherein:
the controller is configured to dynamically detect a new arrangement of the print engines at the print shop, and to update a number of status objects at the GUI based on the new arrangement.

3. The system of claim 1 wherein:
the controller is configured to query a print controller of the printer to determine the arrangement of the print engines at the print shop.

4. The system of claim 1 wherein:
the first arrangement comprises the print engines being arranged in series at the print shop, and
the second arrangement comprises the print engines being arranged in parallel at the print shop.

5. The system of claim 1 wherein:
the first arrangement comprises the print engines operating in a dual simplex mode; and
the second arrangement comprises the print engines operating in a duplex mode.

6. The system of claim 1 wherein:
the printer comprises a continuous-forms media printer.

7. The system of claim 1 wherein:
each status object reports a number of feet printed, and a percentage of progress in printing a print job.

8. A method comprising:
receiving progress information describing print engines of a printer at a print shop;
generating a Graphical User Interface (GUI) for presentation via a display;
determining an arrangement of the print engines at the print shop, wherein the arrangement comprises a physical placement of the print engines relative to each other within a print line;
presenting the GUI with a single status object for the printer via the display, when the print engines are in a first arrangement at the print shop; and
presenting the GUI with multiple status objects for the printer via the display
when the print engines are in a second arrangement at the print shop, wherein each of the multiple status objects corresponds with one of the print engines.

9. The method of claim 8 further comprising:
detecting a new arrangement of the print engines at the print shop; and
updating a number of status objects at the GUI based on the new arrangement.

10. The method of claim 8 further comprising:
querying a print controller of the printer to determine the arrangement of the print engines at the print shop.

11. The method of claim 8 wherein:
the first arrangement comprises the print engines being arranged in series at the print shop, and
the second arrangement comprises the print engines being arranged in parallel at the print shop.

12. The method of claim 8 wherein:
the first arrangement comprises the print engines operating in a dual simplex mode; and
the second arrangement comprises the print engines operating in a duplex mode.

13. The method of claim 8 wherein:
the printer comprises a continuous-forms media printer.

14. The method of claim 8 wherein:
each status object reports a number of feet printed, and a percentage of progress in printing a print job.

15. A non-transitory computer readable medium embodying programmed instructions which, when executed by a processor, are operable for performing a method comprising:
receiving progress information describing print engines of a printer at a print shop;
generating a Graphical User Interface (GUI) for presentation via a display;
determining an arrangement of the print engines at the print shop, wherein the arrangement comprises a physical placement of the print engines relative to each other within a print line;
presenting the GUI with a single status object for the printer via the display, when the print engines are in a first arrangement at the print shop; and
presenting the GUI with multiple status objects for the printer via the display when the
print engines are in a second arrangement at the print shop, wherein each of the multiple status objects corresponds with one of the print engines.

16. The medium of claim 15 wherein the method further comprises:
detecting a new arrangement of the print engines at the print shop; and
updating a number of status objects at the GUI based on the new arrangement.

17. The medium of claim 15 wherein the method further comprises:
querying a print controller of the printer to determine the arrangement of the print engines at the print shop.

18. The medium of claim 15 wherein:
the first arrangement comprises the print engines being arranged in series at the print shop, and
the second arrangement comprises the print engines being arranged in parallel at the print shop.

19. The medium of claim 15 wherein:
the first arrangement comprises the print engines operating in a dual simplex mode; and
the second arrangement comprises the print engines operating in a duplex mode.

20. The medium of claim 15 wherein:
the printer comprises a continuous-forms media printer.

* * * * *